United States Patent [19]

Plath

[11] Patent Number: 4,848,104
[45] Date of Patent: Jul. 18, 1989

[54] KNITTING MACHINE

[75] Inventor: Ernst-Dieter Plath, Albstadt-Tailfingen, Fed. Rep. of Germany

[73] Assignee: Sipra Patententwicklungs-und Beteiligungsgesellschaft mbH, Albstadt, Fed. Rep. of Germany

[21] Appl. No.: 107,579

[22] Filed: Oct. 6, 1987

[30] Foreign Application Priority Data

Oct. 11, 1986 [DE] Fed. Rep. of Germany ....... 3634784

[51] Int. Cl.$^4$ .......................... D04B 9/02; D04B 15/32
[52] U.S. Cl. ........................................... 66/54; 66/104
[58] Field of Search ....................... 66/27, 54, 107, 104

[56] References Cited

U.S. PATENT DOCUMENTS 4,546,623 10/1985 Kuhn et al. .............. 66/104
4,584,851  4/1986 Plath ....................... 66/104
4,693,092  9/1987 Plath .

FOREIGN PATENT DOCUMENTS 3311361  1/1984 Fed. Rep. of Germany .
3433290  3/1986 Fed. Rep. of Germany .
 804735  2/1981 U.S.S.R. ..................... 66/27
 936150  9/1963 United Kingdom ........ 66/64
2144153  2/1985 United Kingdom ........ 66/54
2158106 11/1985 United Kingdom ........ 66/104

Primary Examiner—Wm. Carter Reynolds
Attorney, Agent, or Firm—Michael J. Striker

[57] ABSTRACT

In a multisystem knitting machine with longitudinally displaceable needles and also displaceable and pivotable sinkers which are alternately positioned in a carrier, an adjusting shaft and an adjusting head for each cam system are positioned on a movable slide on which a plunger of a central adjusting device acts so as to move that slide.

11 Claims, 2 Drawing Sheets

KNITTING MACHINE

BACKGROUND OF THE INVENTION

The present invention relates to a knitting machine for manufacturing knitted goods.

Knitting machines of the foregoing type include needles movable in the direction of elongation thereof and plate elements or sinkers movable in the same direction and also pivotable. The needles and the sinkers are arranged in a needle carrier alternately near to one another and are adjustable by specific cam tracks or curves formed by the cams of the common cam support. More specifically, the invention relates to a knitting machine in which sinkers during the withdrawing movement of the associated needle at least partially longitudinally move in the opposite direction, and in which loop sinking cams for sinkers are adjustable by means of adjusting heads in the longitudinal direction of sinkers and needles to change stitch length.

The knitting machine with the aforementioned features has been disclosed in DE-OS 3,311,361 corresponding to applicant's U.S. Pat. No. 4,584,851.

The possibility of the common adjustment of the loop sinking cams for the sinkers has been known from DE-OS 3,433,290. In this known knitting machine, the division of the cam carrier into the needle cam carrier or support and a sinker cam support is necessary which makes the cam area of the knitting machine non-visible and requires large dimensions of the machine in the cam region and longer needle shafts whereas a compact structure of the cam area is impossible to make.

SUMMARY OF THE INVENTION

It is an object of the present invention to provide a knitting machine in which in addition to individual adjustability of the loop sinking cams for sinkers or needles, a common adjustment of the loop sinking cams of a multiple sinker cam system or multiple needle cam system is provided while a compact cam arrangement would be maintained and the subdivision of the cams for needles and sinkers into specific cam supports would be avoided.

These and other objects of the invention are attained by a knitting machine comprising a carrier, a plurality of longitudinally displaceable latch needles and a plurality of sinkers longitudinally displaceable in the same direction as that of said needles and also pivotable, said needles and said sinkers being alternately supported in said carrier one next to another; a stationary cam support; and means for adjusting said needles and sinkers and including a common cam support with cams forming cam tracks wherein the sinkers in the knitting machine during a withdrawing movement of assigned needles are at least partially longitudinally moved in an opposite direction, loop sinking cams for said needles and said sinkers, and adjusting heads acting on said loop sinking cams for adjusting said sinkers in a direction of the longitudinal displacement, said adjusting means further including an adjusting shaft for each adjusting head and a control cam, each adjusting head with an assigned adjusting shaft and control cam being movably supported in said stationary cam support in the direction of longitudinal displacement of at least said sinkers and said needles, said stationary cam support having a recess; a common adjusting plate; and at least one plunger extending through said recess and coupling each adjusting head with the assigned adjusting shaft and control cam with said common adjusting plate which is common for all cam systems.

The knitting machine according to the invention provides, in addition to individual adjustments of the loop-sinking cams, particularly sinker-adjusting cams of individual cam systems, a common uniform adjustment of the loop-sinking cams which overlaps the individual adjustments, without however changing the size of the cam assembly. The cam assembly remains compact and visible, and no extension of the needle shafts is necessary because no subdivision of the cam carrier into the needle cam carrier and the sinker cam carrier is required. The adjustment organs are reliably protected against contamination within the cam support whereby at least one plunger of each cam system can be formed as a multi-part. The plunger parts may be at least partially adjustable relative to each other.

The cam support may be interchangeable and the machine may include a cam plate, said plunger being subdivided into parts along a plane of contact of said cam support with said cam plate.

The adjusting means may further include a slide supported in said stationary cam support, and stops, said adjusting head with the assigned adjusting shaft and said loop-sinking cam being positioned on said slide, an adjustment path of which in the direction of longitudinal displacement of said sinkers is limited at two end positions by said stops.

The machine may include a spring, said slide with said adjusting head, adjusting shaft and control cam being under pre-stressing of said spring in the direction towards said multi-part plunger situated on said common adjusting plate.

The adjusting head with the assigned adjusting shaft and control cam are pivotable about an axis extending transversely to the direction of longitudinal displacement of said sinkers and are loaded with said plunger at a distance from said axis.

A distance between needle heads and said adjusting shaft may be smaller than a distance between the needle heads and feet of adjacent needles.

The present invention is particularly advantageous when applied to multisystem circular knitting machines. Here all cam systems can have a common adjusting plate. The adjusting plate which is common for all cam systems may include a threaded ring concentrically positioned on a needle cylinder, the machine including a stationary support ring, said threaded ring being in engagement with said stationary ring; and drive means for rotating said adjusting ring, and plunger of all cam systems being supported on said adjusting ring.

The toothed ring may be provided which is coupled to said threaded ring against rotation and is coaxially positioned therewith, and an adjusting pinion supported in a stationary housing of the knitting machine and engaged with said toothed ring.

The machine may include a further adjusting shaft having a square-shaped end outwardly protruding from said housing for the application thereto of a special wrench, said further adjusting shaft being connected to said pinion, so that undesired actuation of the further shaft is prevented. The provision of the central adjusting drive with the aforementioned central pinion, provides an easy assembly of the individual cam supports and their interchangeability. The protection of the cams against contamination is maintained. With adjustable sinker cams the needle cams can be fixed and ensure a friction free running of the needles which is very important in the quickly running knitting machines. The central adjustment device can also be provided for cams affecting the needle feet. In this case the adjusting head, adjusting shaft and control cam would be directed towards the cam track of the needle foot.

The central adjustment device according to the invention has the advantage that the cams for sinkers and/or needles are changed only in the loop sinking region and in other regions remain constant. It differs from other central adjusting devices in which the entire cam face is adjusted and thus he path of withdrawal of the needle. There is then the danger that, for example with a small needle withdrawal path the mesh can not slide over the open needle latches.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
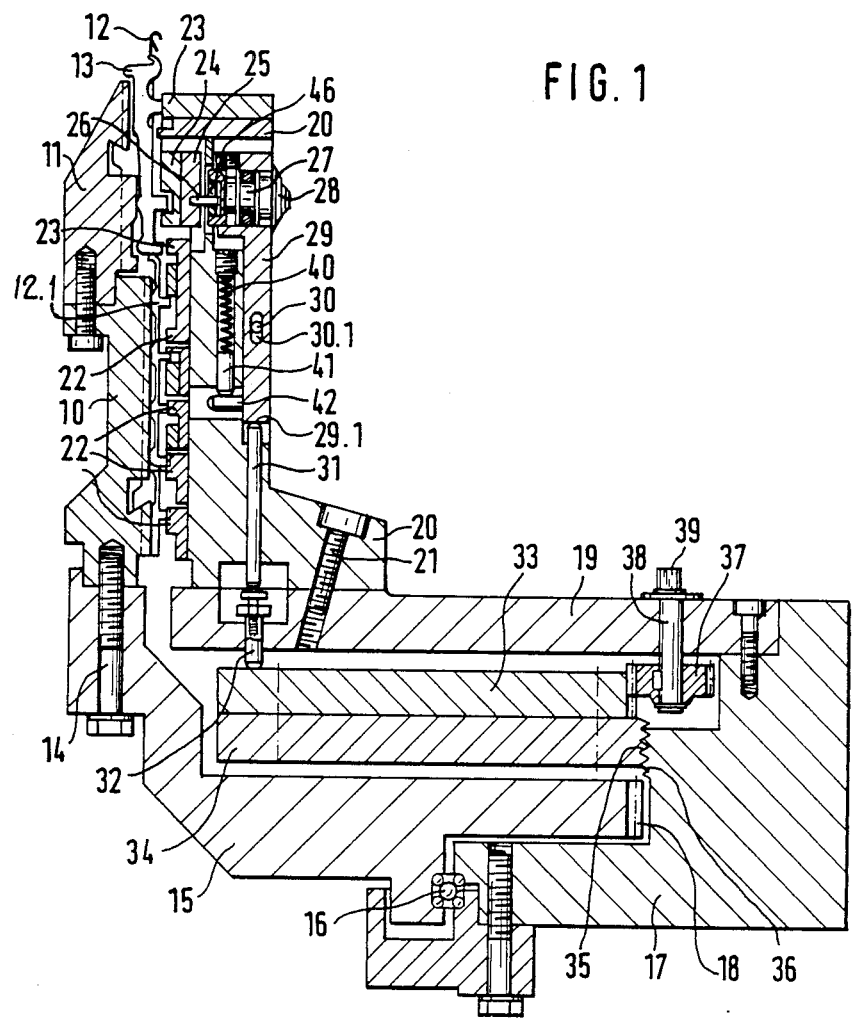
FIG. 1 is a view showing a radial partial section of a rotary cylindrical support for latch needles and sinkers and of a cam support provided in the region of the cam system of the multisystem circular knitting machine with an adjustment device of this invention.

Referring now to the drawings in detail, and firstly to FIG. 1 thereof, it will be seen that FIG. 1 shows a needle cylinder 10 and a sinker cylinder 11 coaxially and rotationfixed mounted on the needle cylinder 10. Longitudinally movable latch needles 12 and sinkers 13 positioned between the needles, also longitudinally movable and pivotable are arranged on those cylinders in the known manner described in U.S. Pat. No. 4,584,851 the suitable part of the disclosure of which is incorporated herein by reference. Reference 12.1 identifies the needle foot.

The needle cylinder 10 is secured by screws 14 to the cylinder support ring 15 which is supported via a play-free ball bearing 16 on a stationary support ring 17 of the frame of the knitting machine and is provided with an external toothed crown 18. A cam plate 19 secured to the stationary support ring 17 is one of the stationary machine components. A cam support 20 of individual cam systems are positioned not adjacent to each other in the known manner on the cam plate 19 and are releasably secured by means of bolts 21.

At the inner side of cam plate 20 which faces away from the needle cylinder 10 are connected cams which serve to control latch needles 12; these cams are designated at 22.

The cam plate 20 of each cam system also carries pressing cams 23 for the pivoting movement of sinkers 13. A one-part loop sinking cam 24 for sinkers 13 which can be divided into a plurality of individual cams is positioned on a plate 25 which is engaged in a control cam curve 46 of an adjusting shaft 27 via an engaging pin 26, shaft 27 being terminated with an adjusting head 28 positioned outwardly of the shaft and provided with a scale. Such an adjusting shaft coupling of the loop sinking cam 24 or withdrawing cam is known in sinker cams and needle cams so that a detailed description and illustration of the coupling mechanism appears to be moot. The engaging pin 26 can be arranged directly on the loop sinking cam 24.

The adjusting shaft 27 with the control cam 46 and adjusting head 28 is positioned in a slide 29 which is displacable in a recess of the cam support 20 in the longitudinal direction of latch needles 12 and sinkers 13. Their displacement path is limited by a stop pin 30 which is connected to the cam support 20 and laterally extends into an oblong opening 30.1 formed in the slide 29. The lower end 29.1 of slide 29 rests on the upper end of a plunger 31 arranged in a vertical guide of the cam support 20. Plunger 31 is the part of the longitudinally adjustable plunger connection relative to all cam systems of the common height-adjusting device. Plunger 31 rests on a second longitudinally adjustable plunger 32 which is supported in the cam plate 19 and projects towards a toothed wheel 33 arranged concentrically with the cylinder support ring 15. The plunger 31 and 32 together form a single plunger composed of two plunger parts. The point of separation between the plungers 31 and 32 lies in the plane of superposing the interchangeable cam support 20 on the cam plate 19. The toothed wheel 33 is fixed against rotation with a coaxial threaded ring 34 the external thread 35 of which is engaged with the internal thread 36 of support ring 17. A pinion 37 is in mesh with the toothed wheel 33. Pinion 37 is secured on an adjustment shaft 38 supported in the cam plate 19. The end of the adjusting shaft 38 extending outwardly from the cam plate 19 is formed as square-shaped head 39 for a nut wrench.

By rotating the adjusting shaft 38 with the aid of the wrench, the threaded ring 34 with the toothed wheel 33 positioned therein are vertically adjusted. This vertical adjustment is transmitted via two plungers 31 and 32 to the slide 29 of each cam system and superimposes individual vertical adjustment of the loop sinking cam 24 performed on the adjusting head 28. The adjustment of the slide 29 takes place against the force of a restoring compression spring 40 which acts on a piston 41 positioned in the cam support 20. Piston 41 in turn in the end position abuts against a pin 42 projecting inwardly of the slide 29.

Figure 2:
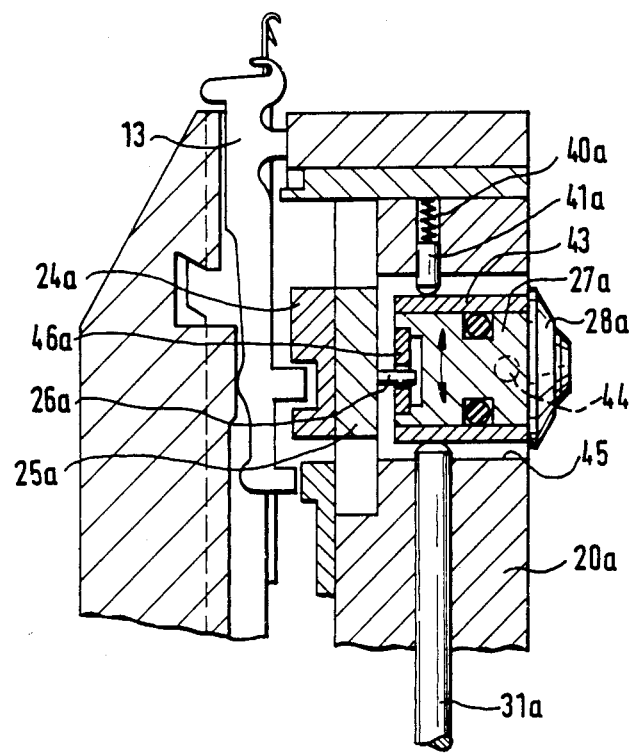
FIG. 2 is an enlarged partial cross-section through the adjustment region of the cam support in accordance with another embodiment of the invention.

The central adjustment device can be constructed so that, as shown in FIG. 2, the adjusting head 28a with the adjusting shaft 27a and the control cam 46a are arranged in a sleeve-like body 43 which is supported pivotally in a recess 45 of the cam support 20a about n axis 44 extending normally to the longitudinal adjustment movement of needles 12 and sinkers 13. In this embodiment, the plunger 31a supported in the cam support 20a lies at the point remote from the pivot axis 44 on the sleeve 43 and causes, upon its longitudinal displacement, a pivoting motion of sleeve 43 against the force of the restoring spring 40a which acts on sleeve 43 via piston 41a. The pivoting movement of sleeve 43 is translated via engaging pin 26a of the individual adjusting device to a plate 25a and thereby to the loop sinking cam 24a. Also in this modified embodiment, the overlapping of the central adjustment of the individual adjustment of the loop sinking cam 24a executed by means of the adjusting head 28 takes place or vice versa.

It will be understood that each of the elements described above, or two or more together, may also find a useful application in other types of knitting machines differing from the types described above.

While the invention has been illustrated and described as embodied in a knitting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a knitting machine comprising a carrier, a plurality of longitudinally displaceable latch needles and a plurality of sinkers longitudinally displaceable in the same direction as that of said needles and also pivotable, said needles and said sinkers being alternately supported in said carrier one next to another; a stationary cam support; and means for adjusting said needles and sinkers and including a common cam support with cams forming cam tracks wherein the sinkers in the knitting machine during a withdrawing movement of assigned needles are at least partially longitudinally moved in an opposite direction, loop sinking cam for said sinkers, and adjusting heads acting on said loop sinking cams for adjusting said sinkers in a direction of the longitudinal displacement, the improvement comprises that said adjusting means further include an adjusting shaft (27, 27a) for each adjusting head (28, 28a) and a control cam (46, 46a), each adjusting head with an assigned adjusting shaft and control cam being movably supported in said stationary cam support in the direction of longitudinal displacement of at least said sinkers and said needles, said stationary cam support having a recess; a common adjusting plate (34); and at least one plunger (31,31a) extending through said recess and coupling each adjusting head with the assigned adjusting shaft and control cam with said common adjusting plate (34) which is common for all cam systems.

2. The knitting machine as defined in claim 1, wherein said plunger is formed of a plurality of parts (31, 32) at least partially longitudinally adjustable relative to each other.

3. The knitting machine as defined in claim 2, and further including a cam plate (19), said plunger being subdivided into parts along a plane of contact of said cam support with said cam plate.

4. The knitting machine as defined in claim 2, wherein said adjusting means further include a slide (29) supported in said stationary cam support (25), and stops (30/30.1), said adjusting head with the assigned adjusting shaft and a loop-sinking cam being positioned on said slide an adjustment path of which in the direction of longitudinal displacement of said sinkers is limited at two end positions by said stops.

5. The knitting machine as defined in claim 4, further including a spring (40), said slide with said adjusting head, adjusting shaft and control cam being under pre-stressing of said spring in the direction towards said multi-part plunger situated on said common adjusting plate.

6. The knitting machine as defined in claim 3, wherein said adjusting head with the assigned adjusting shaft and control cam are pivotable about an axis extending transversely to the direction of longitudinal displacement of said sinkers and are loaded with said plunger at a distance from said axis.

7. The knitting machine as defined in claim 1, wherein said adjusting head, adjusting shaft and control cam are directed to a cam track of a sinker foot.

8. The knitting machine as defined in claim 1, wherein the distances between needle heads and said adjusting shaft are smaller than the distances between the needle heads and needle feet.

9. The knitting machine as defined in claim 1, wherein said carrier includes a needle cylinder, a plurality of said plungers being provided and the adjusting plate which is common for all cam systems including a threaded ring (34) concentrically positioned on said needle cylinder, the machine including a stationary support ring (17), said threaded ring being in engagement with said stationary ring; and drive means (37–39) for rotating said adjusting ring, and the plungers (31, 32) of all cam systems being supported on said adjusting ring (34).

10. The knitting machine as defined in claim 9, wherein a toothed ring (33) is provided which is coupled to said threaded ring against rotation and is coaxially positioned therewith, and an adjusting pinion is provided supported in a stationary housing of the knitting machine and engaged with said toothed ring.

11. The knitting machine as defined in claim 10, including a further adjusting shaft (38) having a square-shaped end outwardly protruding from said housing for the application thereto of a special wrench, said further adjusting shaft being connected to said pinion.

* * * * *